(12) United States Patent
Blais et al.

(10) Patent No.: US 10,025,289 B2
(45) Date of Patent: Jul. 17, 2018

(54) SYSTEM AND METHOD FOR AUTOMATED PART INSPECTION

(71) Applicant: PRATT & WHITNEY CANADA CORP., Longueuil (CA)

(72) Inventors: Mario Blais, Varennes (CA); Sylvain Roberge, Boucherville (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 475 days.

(21) Appl. No.: 14/721,112

(22) Filed: May 26, 2015

(65) Prior Publication Data
US 2016/0349731 A1 Dec. 1, 2016

(51) Int. Cl.
*G05B 19/19* (2006.01)
*G05B 19/404* (2006.01)
(Continued)

(52) U.S. Cl.
CPC ........... *G05B 19/404* (2013.01); *G05B 19/18* (2013.01); *G05B 19/19* (2013.01); *G05B 19/401* (2013.01); *G05B 2219/37441* (2013.01); *G05B 2219/37443* (2013.01); *G05B 2219/37449* (2013.01); *G05B 2219/50289* (2013.01)

(58) Field of Classification Search
CPC .... G05B 19/404; G05B 19/18; G05B 19/401; G05B 2219/37441; G05B 2219/37443; G05B 2219/37449; G05B 2219/50289; G05B 2219/37444; G05B 2219/37448;
(Continued)

(56) References Cited

U.S. PATENT DOCUMENTS 3,718,855 A * 2/1973 Rogel ................. G01N 27/902
324/202
4,712,722 A 12/1987 Hood et al.
(Continued)

OTHER PUBLICATIONS

Mineo et al., "Robotic Path Planning for Non-Destructive Testing of Complex Shaped Surfaces", 41st Annual Review of Progress in Quantitative Nondestructive Evaluation Conference, Jul. 20-25, 2014, Boise, Idaho, USA, http://www.twi-global.com/technical-knowledge/published-papers/robotic-path-planning-for-non-destructive-testing-of-complex-shaped-surfaces/.
(Continued)

*Primary Examiner* — Kenneth M Lo
*Assistant Examiner* — Michael W Choi
(74) *Attorney, Agent, or Firm* — Norton Rose Fulbright Canada LLP (57) ABSTRACT

A system and method for automated part inspection are provided. The method comprises receiving a corrective machine tool program comprising instructions for causing a Numerical Control machine tool to machine at least one finished surface of a part, the corrective machine tool program differing from a nominal machine tool program; determining from the machine tool program a desired position and a desired orientation of an inspection tool relative to the at least one finished surface; and generating an inspection tool path program defining a movement of the inspection tool relative to the part, the inspection tool path program comprising instructions for placing the inspection probe at the desired position and the desired orientation and acquiring at least one measurement of the at least one new finished surface.

20 Claims, 6 Drawing Sheets

(51) Int. Cl.
*G05B 19/18* (2006.01)
*G05B 19/401* (2006.01)

(58) Field of Classification Search
CPC .............. G05B 19/4015; G05B 19/402; G05B 2219/37452; G01B 7/06; G01N 27/90
USPC ................................................ 700/176, 195
See application file for complete search history.

(56) References Cited

U.S. PATENT DOCUMENTS

| | | | | |
|---|---|---|---|---|
| 5,117,169 | A * | 5/1992 | Kakino | ............... G05B 19/401 318/570 |
| 5,345,514 | A | 9/1994 | Mandavieh et al. | |
| 6,252,393 | B1 * | 6/2001 | Hedengren | ............ G01B 21/042 324/202 |
| 7,337,651 | B2 | 3/2008 | Shankarappa et al. | |
| 8,179,132 | B2 | 5/2012 | Wu et al. | |
| 8,844,132 | B2 | 9/2014 | Blais et al. | |
| 9,235,205 | B2 * | 1/2016 | Prestidge | ............. G05B 19/401 |
| 2005/0171733 | A1 | 8/2005 | Hough | |
| 2006/0090336 | A1 | 5/2006 | Graham et al. | |
| 2008/0278151 | A1 | 11/2008 | Wang et al. | |
| 2009/0144980 | A1 * | 6/2009 | Rangarajan | ............. B23P 6/007 29/889.1 |
| 2010/0117636 | A1 * | 5/2010 | Dasch | .................... G01N 27/90 324/222 |
| 2010/0207619 | A1 | 8/2010 | Wu et al. | |
| 2013/0019477 | A1 * | 1/2013 | Blais | ........................ B23C 3/18 29/889.7 |
| 2014/0207403 | A1 | 7/2014 | Messinger et al. | |
| 2015/0276371 | A1 * | 10/2015 | Xu | ........................... G01B 7/10 702/97 |
| 2016/0075028 | A1 * | 3/2016 | Bain | ..................... B25J 9/1684 700/110 |

OTHER PUBLICATIONS

European Search Report dated Nov. 7, 2016 in connection with application No. 16171367.2—10 pages.

* cited by examiner

SYSTEM AND METHOD FOR AUTOMATED PART INSPECTION

TECHNICAL FIELD

The application relates generally to automated part inspection.

BACKGROUND OF THE ART

Friction welding can be used to join aircraft components together, e.g. to join fan blades to a hub. It is then desirable to inspect the welds. For this purpose, Eddy Current Inspection (ECI) is typically used. Such inspection is usually performed manually by an inspector manipulating a probe connected to a portable eddy current instrument and scanning the welds with the probe. Automated ECI systems also exist but these systems are limited by the fact that the friction welding technique generates a considerable variation in blade positioning. Indeed, the joining process can result in a mismatch between the components and there is then a need to machine the mismatch. The tool path designed for this machining operation is usually defined in a nominal mode. However, differences exist between the nominal profile and the actual profile of the parts, due for instance to fabrication and positioning tolerances. As such, using nominal tooth path positioning is problematic in automated ECI systems because the ECI probe would be misplaced in relation to the real location of the weld. The inspection will in turn be of limited value if the probe is not accurately located on the weld.

There is therefore a need for an improved system and method for part inspection.

SUMMARY

In one aspect, there is provided a computer-implemented method for automated part inspection. The method comprises receiving a corrective machine tool program comprising instructions for causing a Numerical Control machine tool to machine at least one finished surface of a part, the corrective machine tool program differing from a nominal machine tool program; determining from the machine tool program a desired position and a desired orientation of an inspection tool relative to the at least one finished surface; and generating an inspection tool path program defining a movement of the inspection tool relative to the part, the inspection tool path program comprising instructions for placing the inspection probe at the desired position and the desired orientation and acquiring at least one measurement of the at least one new finished surface.

In another aspect, there is provided a system for automated part inspection. The system comprises, a memory, a processor, and at least one application stored in the memory and executable by the processor for receiving a corrective machine tool program comprising instructions for causing a Numerical Control machine tool to machine at least one finished surface of a part, the corrective machine tool program differing from a nominal machine tool program; determining from the machine tool program a desired position and a desired orientation of an inspection tool relative to the at least one finished surface; and generating an inspection tool path program defining a movement of the inspection tool relative to the part, the inspection tool path program comprising instructions for placing the inspection probe at the desired position and the desired orientation and acquiring at least one measurement of the at least one new finished surface.

In some embodiments, the system comprises and/or is operatively connected to an inspection probe configured to inspect the part.

In a further aspect, there is provided a non-transitory computer readable medium having stored thereon program code executable by a processor for performing the steps of the method described herein.

DESCRIPTION OF THE DRAWINGS

Reference is now made to the accompanying figures in which.

DETAILED DESCRIPTION

Figure 1:
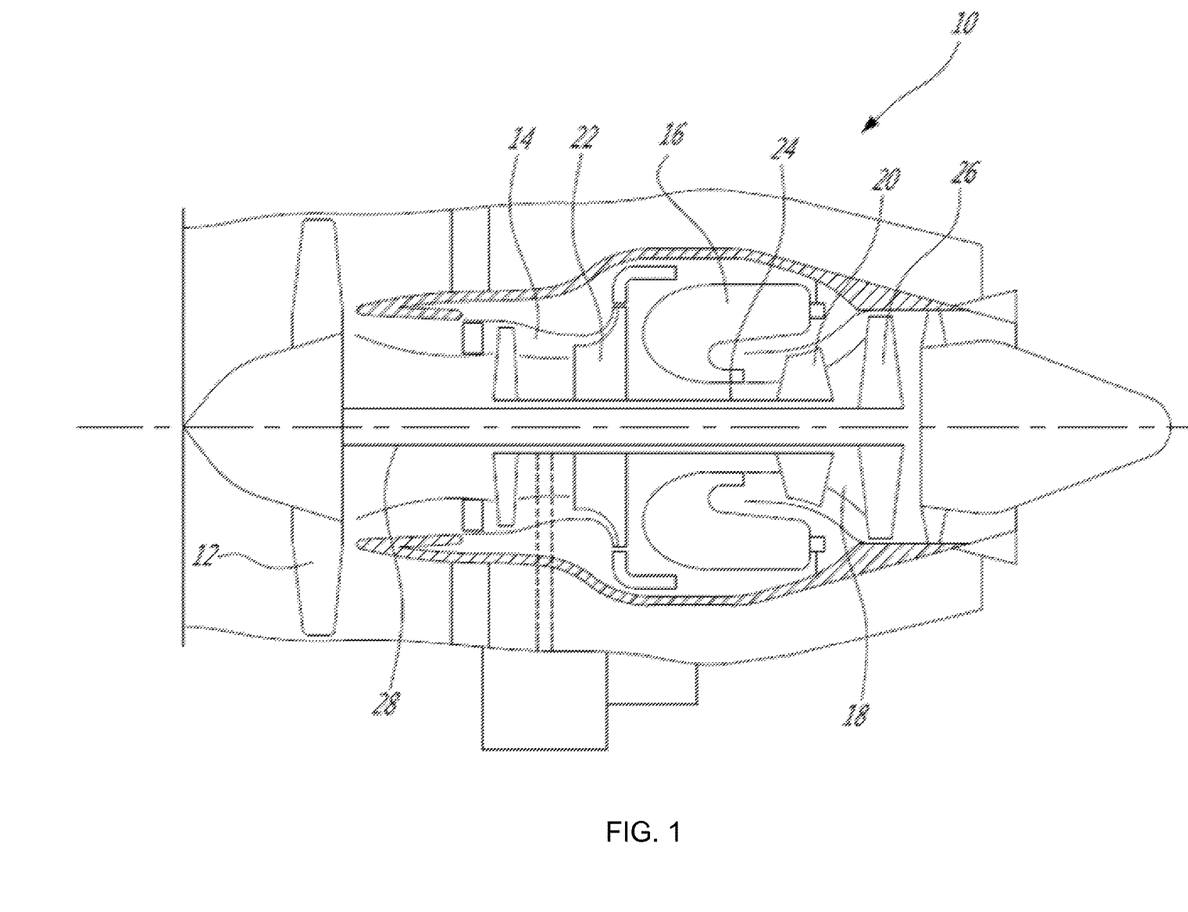
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. High pressure rotor(s) 20 of the turbine section 18 are drivingly engaged to high pressure rotor(s) 22 of the compressor section 14 through a high pressure shaft 24. Low pressure rotor(s) 26 of the turbine section 18 are drivingly engaged to the fan rotor 12 and to other low pressure rotor(s) (not shown) of the compressor section 14 through a low pressure shaft 28 extending within the high pressure shaft 24 and rotating independently therefrom.

Figure 2:
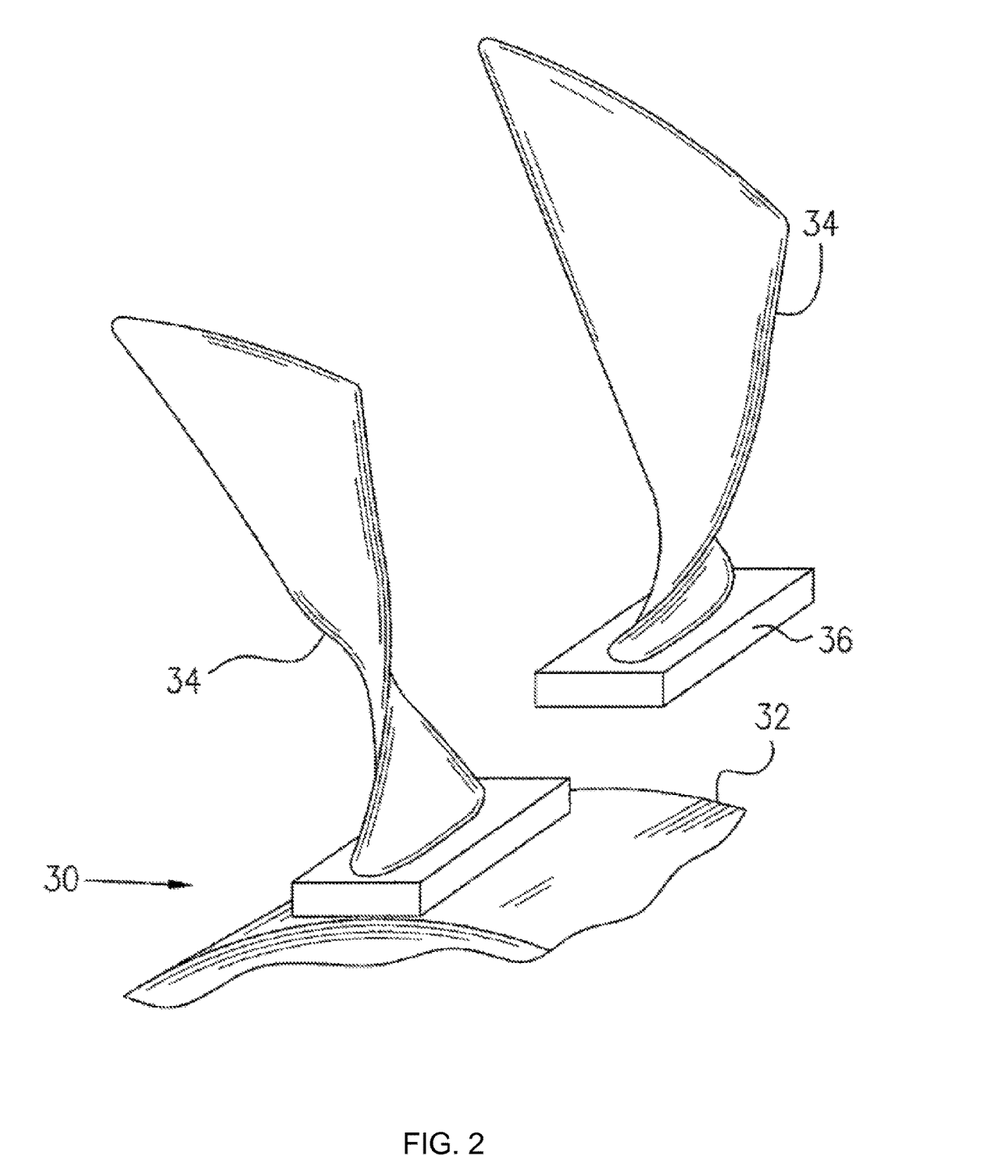
FIG. 2 is a perspective view of an integrally bladed rotor used in the engine of FIG. 1, showing the integrally bladed rotor in a joining process (only two blades are shown)

Referring to FIG. 2 in addition to FIG. 1, each one of the rotors 20, 22 used in the turbine section 18 and the compressor section 14 may be formed as an integrally bladed rotor 20 comprising a disc 32 having an array of blades 34 affixed to a periphery thereof. For the sake of illustration and clarity, only part of the disc 32 and two blades 34 are shown in FIG. 2. The blades 34 extend radially outwardly from the disc 32 and are circumferentially spaced apart from one another. In one embodiment, the disc 32 and the individual blades 34 are fabricated individually and the individual blades 34 are attached to the periphery of the disc in a joining operation, such as a welding process. As shown in FIG. 2, one of the blades 34 is positioned on the periphery of the disc 34 and another one of the blades 34 is about to be placed on the disc 34 during the welding procedure, such as linear friction welding, which is applied along a joint area between the individual blades 34 and the disc 32, thereby forming the integrally bladed rotor 30.

Each blade 34 includes a root block 36 affixed to the bottom of the blade 34 for holding the blade 34 on the disc 32 during the welding procedure. After the welding procedure, the root block 36 is machined out to form a bottom portion of the blade 34. During the welding procedure, it is possible to cause a mismatch between the top blade portion and the blade bottom which is part of the disc 32 and such a mismatch is also typically machined out in the machining operation performed after the welding procedure. The machining operation that follows the welding procedure may be conducted by a Numerical Control (NC) machine tool, for example in a flank and/or point milling operation in which a tool, such as a milling cutter 38, follows instructions contained in a corrective machine tool program to machine out the mismatch between the blade 34 and the root block 36, thereby forming the integrally bladed rotor 30.

The tool path followed by the NC machine tool may be a nominal tool path defined in a Computer Aided Design (CAD) file. The nominal tool path may be calculated and generated based on a nominal profile of the integrally bladed rotor 30, which is also defined in a nominal model provided for example in a CAD file. As used herein, the term "nominal" as applied to a part, surface, geometrical element, etc., is intended to refer to the part, surface, geometrical element (e.g. a surface, profile, angle, plate, or other feature defining the part), etc., as defined in a theoretical model such as a CAD model or other digitally stored or recreated model, without tolerance, which may be used as a reference when machining one or a plurality of similar actual parts, surfaces, geometrical elements, etc. The term "real", "actual", or "true" as applied to a part, surface, geometrical element, etc., is intended to refer to the real, physical part, surface, geometrical element, etc., at various stages of the manufacturing process, including any variation brought by that process.

The nominal profiles of the respective blades 34 are illustratively identical. However, for each blade, differences between the blade's nominal profile and the blade's actual profile may exist due to acceptable fabrication tolerances in the previous fabrication procedures of the respective parts of the integrally bladed rotor 30 and acceptable positioning tolerances during the welding procedure. If the machining operation succeeding the welding procedure follows the nominal tool path without correction or modification, the respective parts of the integrally bladed rotor 30 may be damaged due to the differences between the blades' nominal profile and the blades' actual profile. It is therefore desirable for the NC machine tool to perform the machining operation (e.g. the flank and/or point milling operation) on each finished surface (e.g. at the suction side, pressure side, leading edge, and trailing edge) of the respective blades 34 of the rotor 30 following newly created tool paths. These new tool paths may be defined by a newly created (or corrective) machine tool program and when followed result in generation of new finished surfaces for the blades 34, the new finished surfaces having optimized material removal and minimizing mismatch. In one embodiment, the method described in commonly assigned U.S. Pat. No. 8,844,132 entitled METHOD OF MACHINING USING AN AUTOMATIC TOOL PATH GENERATOR ADAPTED TO INDIVIDUAL BLADE SURFACES ON AN INTEGRALLY BLADED ROTOR, and which the entire disclosure thereof is hereby incorporated by reference, may be used to generate the new machine tool program.

As can be seen in FIG. 2, the blades 34 have a twisting and curved configuration, resulting in blade surfaces with a complex geometry. The new created machine tool program takes the complex blade geometry into account to define positions and orientations for the machine tool. In particular, the new machine tool program differs from the nominal machine tool program (e.g. comprises a series of modified commands that replace a corresponding series of nominal commands defined in the nominal machine tool program) such that, following the new tool paths, the NC machine tool machines the blade surfaces, e.g. in the flank and/or point milling operation, by continuously moving on the blades 34, changing positions and orientations in order to generate the new finished blade surfaces having the desired complex geometry. In one embodiment, according to the proposed inspection method, data obtained from the newly created (or corrective) machine tool program is used to perform inspection, e.g. Eddy Current Inspection (ECI), of the new finished surfaces of the blades 34. It should be understood that although the description refers to the inspection being ECI inspection and the inspection probe accordingly being an eddy current probe, any suitable inspection technique other than ECI, including but not limited to ultrasonic inspection, may also apply. The data obtained from the corrective machine tool program may comprise features of the part, such as a delineation of the part's contour, an orientation of the part, information relative to a quality of the part, e.g. whether the part contains any defects, and/or an indication of a location of defects to be inspected. Upon processing the corrective tool path data, it then becomes possible to determine the real position of the partially completed welds to be inspected and define this position in the inspection tool path, thereby improving the accuracy of the automated ECI process. Although the description refers to inspection of welds, it should be understood that the proposed inspection method and system may be used to inspect other defects. In particular, any area of a part which will operate under high stress, and is therefore considered as critical, may be inspected using the proposed method and system.

Figure 3:
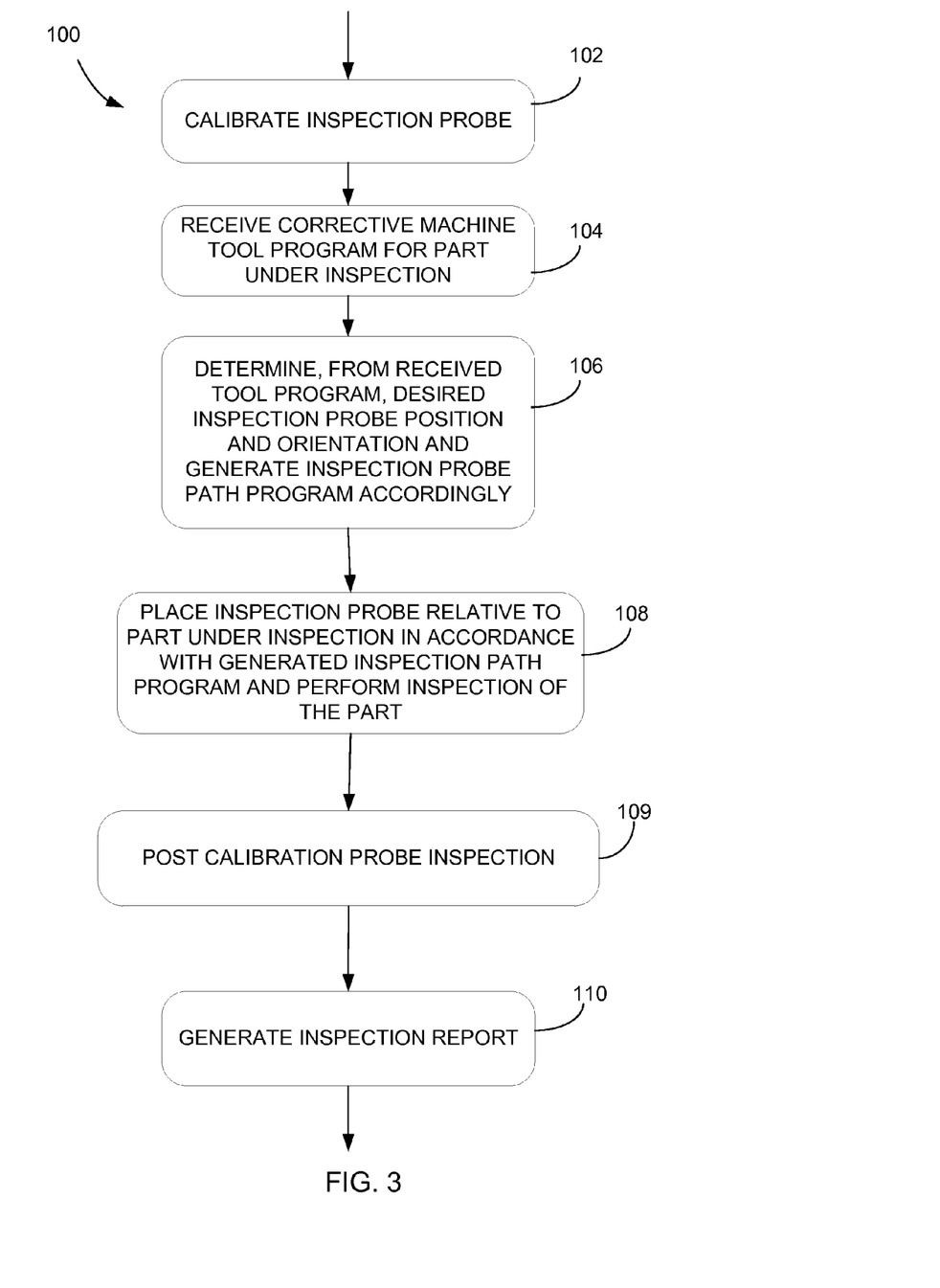
FIG. 3 is a flowchart of a method for automated inspection of a part having a complex geometry, in accordance with an illustrative embodiment.

FIG. 3 illustrates a method 100 for automated inspection of a part having a complex geometry, in accordance with an exemplary embodiment. The method 100 may be used to perform ECI inspection (or any other suitable inspection technique) when the parts are in the finished condition, e.g. after blending and blue etch operations have been completed for the part. In accordance with the method 100, an eddy current probe (or any other suitable inspection probe) may be used to determine a position of any weld defects present on the part under inspection (e.g. the new finished surfaces of the blades 34 of FIG. 2) by inducing eddy currents in the part and measuring the eddy currents using an eddy current detector connected to the probe. The probe is then moved relative to the part along an inspection probe path that defines the movement of the probe relative to the part. The probe may be moved by a single or multi-axis machine having varying degrees of freedom of automated motion. It should be understood that, in some embodiments, the probe may be moved manually. In other embodiments, the probe may be held stationary while the part is being moved relative to the part.

Figure 4:
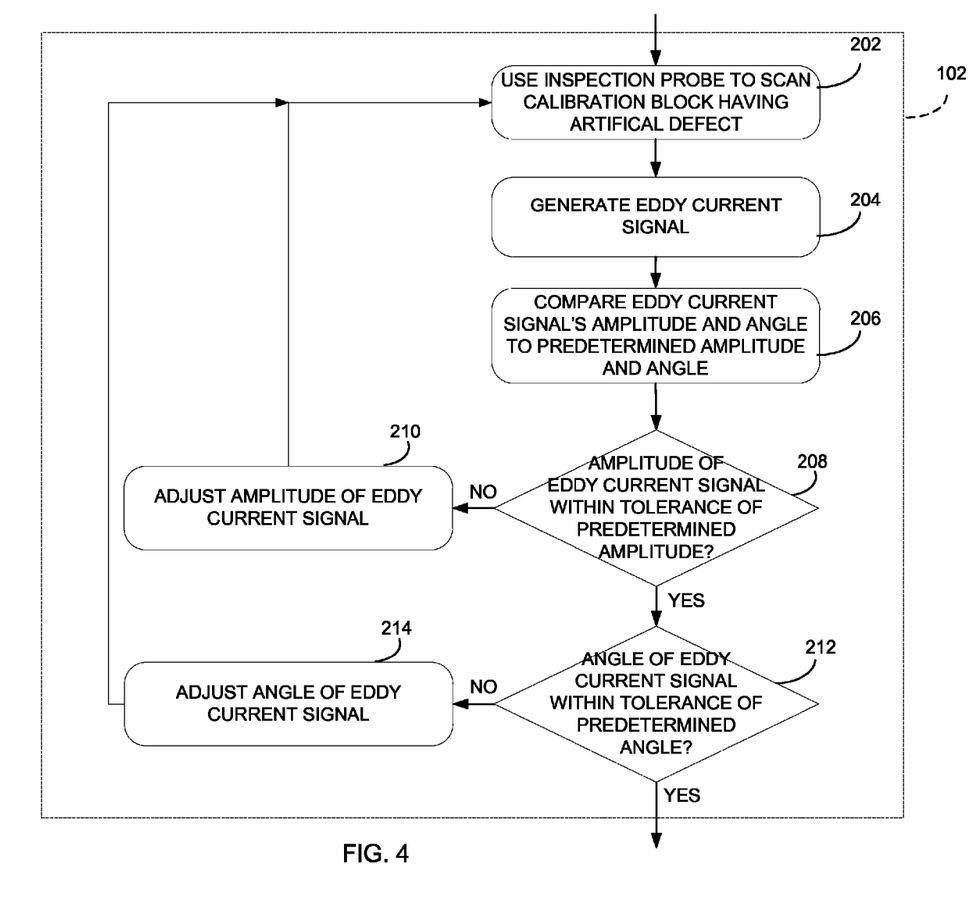
FIG. 4 is a flowchart of a method for calibrating the inspection tool, in accordance with an illustrative embodiment.

In accordance with the method 100, prior to performing ECI inspection, the eddy current probe may first be calibrated at step 102. The calibration step 102 allows to validate proper operation of the inspection probe before as well as after inspection. In this manner, automated sensitivity verification of the eddy current system can be performed. As illustrated in FIG. 4, the calibration step 102 illustratively comprises using the inspection probe to scan at step 202 a workpiece or calibration block having an artificial defect thereon. An eddy current signal is accordingly generated at step 204. At step 206, the amplitude and the angle of the generated eddy current signal are then respectively compared to a predetermined amplitude and a predetermined angle. The predetermined eddy current signal amplitude and angle may have been determined in accordance with the required sensitivity applicable to the specific area of the part under inspection and may be retrieved from memory to perform the comparison. The next step 208 is then to determine whether the amplitude of the eddy current signal generated at step 204 is within a given tolerance or threshold (e.g. +/−0.1 volt) of the predetermined amplitude. If this is not the case, i.e. the amplitude of the generated eddy current signal is beyond the tolerance, the next step 210 is to adjust the amplitude of the eddy current signal. The amplitude may be adjusted at step 210 by increasing the voltage injected to the probe. The method then flows back to step 202 where the inspection probe scans the calibration block again until the desired amplitude value is obtained. If it is determined at step 208 that the amplitude of the eddy current signal generated at step 204 is within a given tolerance, the next step 212 is to assess whether the angle of the eddy current signal generated at step 204 is within a given tolerance of the predetermined angle. If this is the case, the step 102 ends. Otherwise, the angle of the generated eddy current is adjusted at step 214 by rotating the angle of the signal and the method flows back to step 202 where the inspection probe scans the calibration block again until the desired angle (e.g. vertical) is obtained.

After the calibration step 102, the corrective machine tool program (i.e. the newly created tool paths discussed above) generated for the part under inspection is received at step 104. As discussed above, the machining tool path received at step 104 is adapted to each part under inspection (e.g. each blade) and adjusts for variations in part shape, orientation, and position. The machining tool path allows transition between the already machined part (e.g. the actual blade) and the CAD model for the part (e.g. the nominal blade). In one embodiment, the corrective machining tool path starts on the actual part surface and is realigned on the nominal part surface at the root. The desired position and orientation of the inspection probe are then determined and the inspection probe path program is generated at step 106 for the part under inspection. The probe is then positioned relative to the part and its movement controlled in accordance with the generated inspection probe path program to perform inspection of the part at step 108. In some embodiments, a post-calibration inspection of the probe may be performed, as per step 109, in order to confirm that the amplitude of the signal is still equal to or greater than the calibration signal. A final inspection report may be automatically generated at step 110.

In one embodiment, the inspection probe path program is generated in step 106 for each part according to a plurality of constraints. In particular, the inspection probe path program is illustratively defined so as to ensure that the eddy current probe is in constant contact with a surface of the part under inspection. The inspection probe path program is also illustratively defined to ensure normal orientation of the probe relative to the surface of the part. In addition, the inspection probe path program is illustratively defined to ensure that the inspection probe has a constant pressure relative to the part under inspection. As a result, the desired position and orientation of the inspection probe may be determined at step 106 by computing normals to the surfaces of the part under inspection, e.g. the blade surfaces. Computation of the surface normals provides coordinates (e.g. x, y, z, i, j, k vector coordinates in a six-axis coordinate system of the NC system) for each point on the inspection probe path, the coordinates defining the direction and orientation of tool motion in relation to part geometry. As a result, the inspection probe path program is then generated in step 106 by precisely knowing the real position of welded segments (e.g. precision machined or precision forged working airfoil surface) to be inspected. During the ECI inspection, the inspection probe is therefore accurately located on the welds and scans the exact area to be inspected, thereby achieving increased accuracy. It should be understood that, since the pressure is to remain similar along each surface to be inspected, knowledge of the desired position and orientation of the inspection probe, and more particularly knowledge of the actual location of the surfaces to be inspection, allows to achieve the desired pressure.

Figure 5:
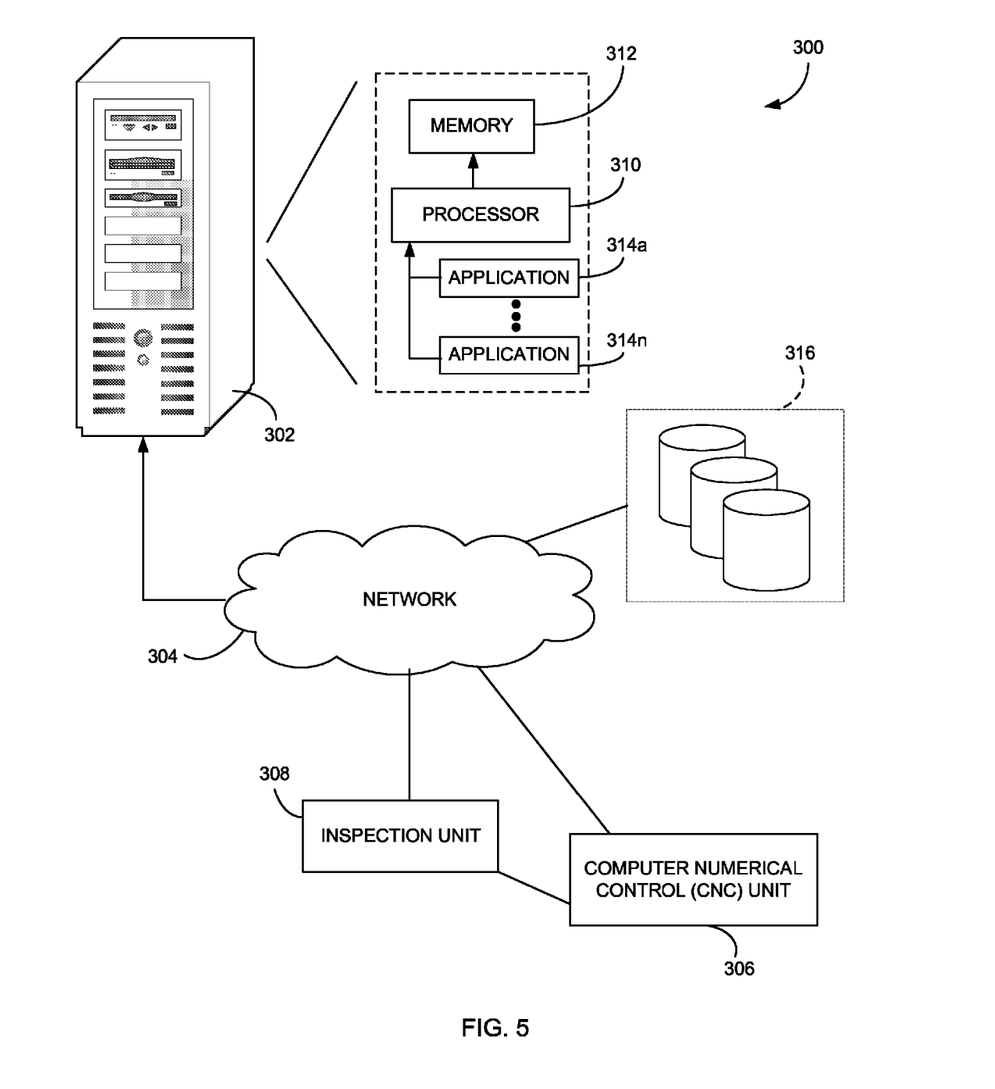
FIG. 5 is a schematic diagram of a system for automated inspection of a part having a complex geometry, in accordance with an illustrative embodiment.

Referring now to FIG. 5, a system 300 for automated inspection (e.g. ECI) of a part (e.g. a blade) having a complex geometry, in accordance with an exemplary embodiment, will now be described. The system 300 may be used to perform the method described herein above with reference to FIG. 3 and FIG. 4. The system 300 comprises one or more server(s) 302. For example, a series of servers corresponding to a web server, an application server, and a database server may be used. These servers are all represented by server 302 in FIG. 5. The server 302 is in communication over a network 304, such as the Internet, a cellular network, or others known to those skilled in the art, with a Computer Numerical Control (CNC) unit 306. The CNC unit 306 may comprise a CNC machine (not shown) comprising a tool (not shown) adapted to machine (e.g. perform a flank and/or point milling operation on) a part (not shown). The CNC unit 306 is further connected to an inspection unit 308, such as an Eddy Current Inspection (ECI) unit, that is in communication with the server 302 over the network 304. The inspection unit 308 may comprise an eddy current probe (not shown) connected to an eddy current detector (not shown).

The server 302 may comprise, amongst other things, a processor 310 coupled to a memory 312 and having a plurality of applications 314a, . . . , 314n running thereon. The processor 310 may access the memory 312 to retrieve data. The processor 310 may be any device that can perform operations on data. Examples are a central processing unit (CPU), a microprocessor, and a front-end processor. The applications 314a, . . . , 314n are coupled to the processor 310 and configured to perform various tasks as explained below in more detail. It should be understood that while the applications 314a, . . . , 314n presented herein are illustrated and described as separate entities, they may be combined or separated in a variety of ways.

The memory 312 accessible by the processor 310 may receive and store data. The memory 312 may be a main memory, such as a high speed Random Access Memory (RAM), or an auxiliary storage unit, such as a hard disk or flash memory. The memory 312 may be any other type of memory, such as a Read-Only Memory (ROM), Erasable Programmable Read-Only Memory (EPROM), or optical storage media such as a videodisc and a compact disc.

One or more databases 316 may be integrated directly into the memory 312 or may be provided separately therefrom and remotely from the server 302 (as illustrated). In the case of a remote access to the databases 316, access may occur via any type of network 304, as indicated above. The databases 316 described herein may be provided as collections of data or information organized for rapid search and retrieval by a computer. The databases 316 may be structured to facilitate storage, retrieval, modification, and deletion of data in conjunction with various data-processing operations. The databases 316 may consist of a file or sets of files that can be broken down into records, each of which consists of one or more fields. Database information may be retrieved through queries using keywords and sorting commands, in order to rapidly search, rearrange, group, and select the field. The databases 316 may be any organization of data on a data storage medium, such as one or more servers.

In one embodiment, the databases 316 are secure web servers and Hypertext Transport Protocol Secure (HTTPS) capable of supporting Transport Layer Security (TLS), which is a protocol used for access to the data. Communications to and from the secure web servers may be secured using Secure Sockets Layer (SSL). Identity verification of a user may be performed using usernames and passwords for all users. Various levels of access rights may be provided to multiple levels of users.

Alternatively, any known communication protocols that enable devices within a computer network to exchange information may be used. Examples of protocols are as follows: IP (Internet Protocol), UDP (User Datagram Protocol), TCP (Transmission Control Protocol), DHCP (Dynamic Host Configuration Protocol), HTTP (Hypertext Transfer Protocol), FTP (File Transfer Protocol), Telnet (Telnet Remote Protocol), SSH (Secure Shell Remote Protocol).

Figure 6:
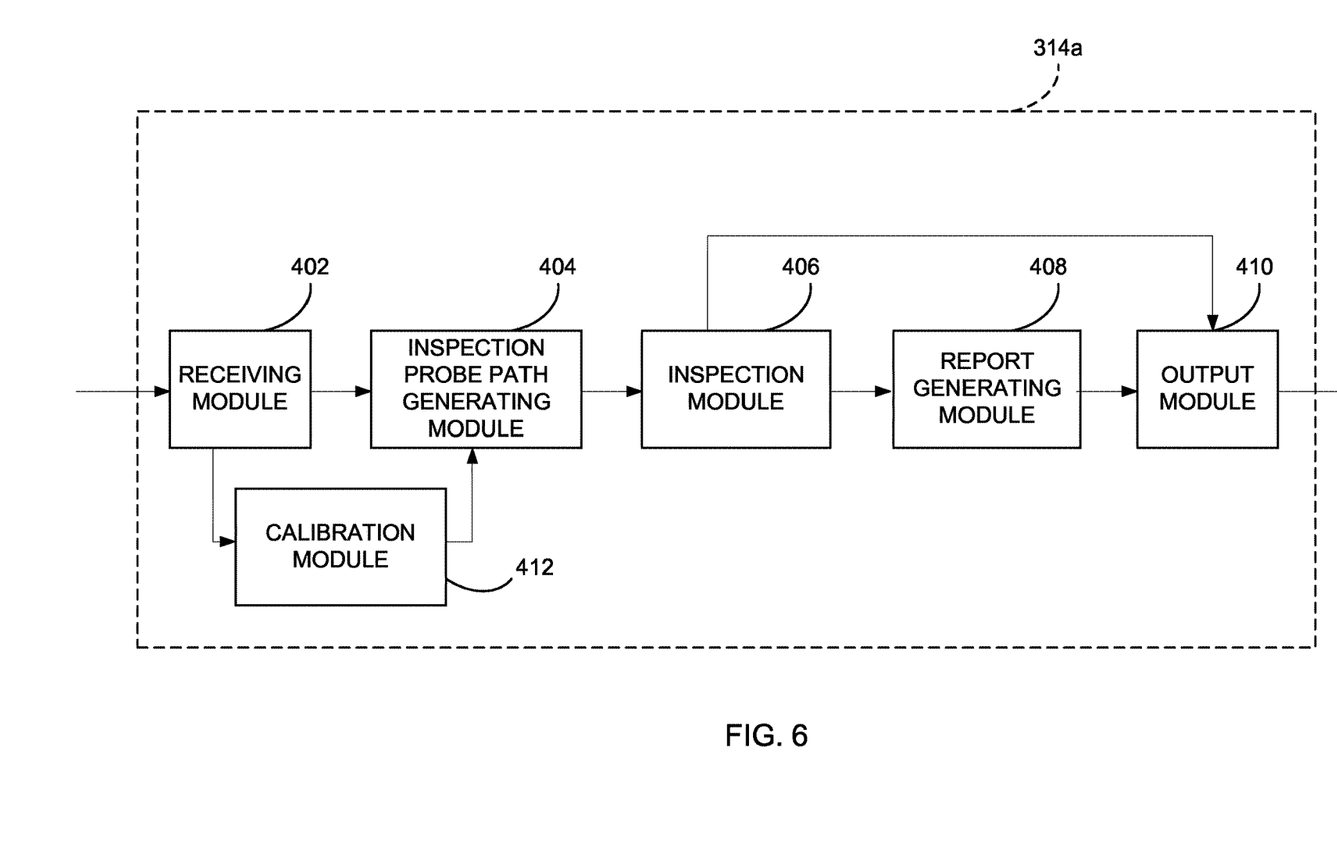
FIG. 6 is a schematic diagram of an application running on the processor of FIG. 4.

FIG. 6 is an exemplary embodiment of an application 314a running on the processor 310 of FIG. 5. The application 314a illustratively comprises a receiving module 402, an inspection probe path generating module 404, an inspection module 406, a report generating module 408, and an output module 410. The application 314a may further comprise a calibration module 412 that may generate instructions for causing calibration of the inspection probe provided in inspection unit 308, in accordance with the method steps discussed above with reference to FIG. 4. The calibration may be performed before the beginning of the inspection process implemented using the inspection probe path generating module 404 and the inspection module 406.

The receiving module 402 illustratively receives a corrective machine tool program for a part (e.g. a blade) under inspection. The received data is then sent by the receiving module 402 to the inspection probe path generating module 404, which may process the received machine tool program to determine therefrom a desired position and orientation of the inspection probe. This may comprise computing, on the basis of the from the machine tool program, surface normals for the part under inspection (e.g. computing a normal direction to the blade surfaces). The inspection probe path generating module 404 may further generate an inspection probe path program in accordance with the desired probe position and orientation. As discussed above with reference to FIG. 3, the inspection probe path generating module 404 may generate an inspection probe path program that satisfies a number of constraints, including that the inspection probe is in constant contact with a surface of the part under inspection and that normal orientation of the probe relative to the surface of the part is ensured.

The inspection probe path generating module 404 may then send the generated inspection probe path program to the inspection module 406, which causes the part to be inspection in accordance with the instructions found in the inspection probe path program. In particular, the inspection module 406 may cause the inspection probe to be precisely positioned relative to the part, e.g. at the desired position and orientation. The inspection module 406 may also cause movement of the inspection probe to be controlled according to the inspection probe path for performing the inspection. Once inspection of the part has been completed, the report generating module 408 may be used to generate a final inspection report in an automated manner. The output module 410 may then format data for transmission and/or rendering on a suitable output device, e.g. for presentation to a user.

It should be understood that other variants to the configurations of the receiving module 402, the inspection probe path generating module 404, the inspection module 406, the report generating module 408, the output module 410, and the calibration module 412 may also be provided and the example illustrated is simply for illustrative purposes.

The above description is meant to be exemplary only, and one skilled in the art will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified. While illustrated in the block diagrams as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment. The present disclosure may be embodied in other specific forms without departing from the subject matter of the claims. Also, one skilled in the relevant arts will appreciate that while the systems, methods and computer readable mediums disclosed and shown herein may comprise a specific number of elements/components, the systems, methods and computer readable mediums may be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims.

The invention claimed is:

1. A computer-implemented method for automated part inspection, the method comprising:

receiving a corrective machine tool program comprising instructions for causing a Numerical Control machine tool to machine at least one finished surface of a part, the corrective machine tool program having instructions different from instructions of a nominal machine tool program;

determining from the corrective machine tool program a desired position and a desired orientation of an inspection tool relative to the at least one finished surface;

generating an inspection tool path program defining a movement of the inspection tool relative to the part, the inspection tool path program comprising instructions for placing the inspection tool at the desired position and the desired orientation; and moving the inspection tool according to the instructions of the inspection tool path program and acquiring at least one measurement of the at least one new finished surface.

2. The method of claim 1, wherein the corrective machine tool program as received comprises instructions for causing the machine tool to execute a series of modified commands that replace a corresponding series of nominal commands defined in the nominal machine tool program for the part.

3. The method of claim 1, wherein the inspection tool path program defines the movement of the inspection tool relative to the part for performing eddy current inspection of welds formed on the part.

4. The method of claim 1, wherein the corrective machine tool program as received comprises instructions for correcting at least one defect formed on the part as a result of a welding operation performed on the part.

5. The method of claim 1, wherein the corrective machine tool program as received comprises instructions for causing the machine tool to perform a flank and point milling operation.

6. The method of claim 1, wherein determining from the corrective machine tool program the desired position of the inspection tool comprises determining a location of at least one defect on the part for inspection by the inspection tool.

7. The method of claim 1, wherein generating the inspection tool path program comprises generating instructions for at least one of:

enabling a constant contact of the inspection tool with the at least one finished surface;

maintaining a constant pressure of the inspection tool on the at least one finished surface; and orienting the inspection tool in a normal direction relative to the at least one finished surface.

8. The method of claim 7, wherein determining from the corrective machine tool program the desired orientation of the inspection tool comprises computing at least one normal to the at least one finished surface and obtaining from the at least one normal coordinates for each point along the inspection tool path program.

9. The method of claim 1, further comprising calibrating the inspection tool by:

receiving an eddy current signal in response to scanning of a calibration block with the inspection tool, the calibration block having an artificial defect thereon;

comparing an amplitude of the eddy current signal to a predetermined amplitude, and if the amplitude of the eddy current signal is not within a given tolerance of the predetermined amplitude, increasing a voltage applied to the inspection tool for adjusting the amplitude of the eddy current signal and repeating the scanning and comparing; and comparing a phase angle of the eddy current signal to a predetermined phase angle, and if the phase angle of the eddy current signal is not within a given tolerance of the predetermined phase angle, rotating an angle of the eddy current signal and repeating the scanning and comparing.

10. The method of claim 9, wherein comparing the amplitude of the eddy current signal to a predetermined amplitude and comparing the phase angle of the eddy current signal to a predetermined phase angle comprises comparing the amplitude and the phase angle pre-inspection.

11. The method of claim 9, wherein comparing the amplitude of the eddy current signal to a predetermined amplitude is performed post-inspection.

12. A non-transitory computer readable medium having stored thereon program code executable by a processor for performing any one of claims 1 to 11.

13. A system for automated part inspection, the system comprising:

a memory;

a processor; and at least one application stored in the memory and executable by the processor for:

receiving a corrective machine tool program comprising instructions for causing a Numerical Control machine tool to machine at least one finished surface of a part, the corrective machine tool program having instructions different from instructions of a nominal machine tool program;

determining from the corrective machine tool program a desired position and a desired orientation of an inspection tool relative to the at least one finished surface;

generating an inspection tool path program defining a movement of the inspection tool relative to the part, the inspection tool path program comprising instructions for placing the inspection tool at the desired position and the desired orientation; and moving the inspection tool according to the instructions of the inspection tool path program and acquiring at least one measurement of the at least one new finished surface.

14. The system of claim 13, wherein the inspection tool path program defines the movement of the inspection tool relative to the part for performing eddy current inspection of welds formed on the part.

15. The system of claim 13, wherein determining from the corrective machine tool program the desired position of the inspection tool comprises determining a location of at least one defect on the part for inspection by the inspection tool.

16. The system of claim 13, wherein generating the inspection tool path program comprises generating instructions for at least one of:

enabling a constant contact of the inspection tool with the at least one finished surface;

maintaining a constant pressure of the inspection tool on the at least one finished surface; and orienting the inspection tool in a normal direction relative to the at least one finished surface.

17. The system of claim 16, wherein determining from the corrective machine tool program the desired orientation of the inspection tool comprises computing at least one normal to the at least one finished surface and obtaining from the at least one normal coordinates for each point along the inspection tool path program.

18. The system of claim 13, wherein the application is further configured for calibrating the inspection tool by:

receiving an eddy current signal in response to scanning of a calibration block with the inspection tool, the calibration block having an artificial defect thereon;

comparing an amplitude of the eddy current signal to a predetermined amplitude, and if the amplitude of the eddy current signal is not within a given tolerance of the predetermined amplitude, increasing a voltage applied to the inspection tool for adjusting the amplitude of the eddy current signal and repeating the scanning and comparing; and comparing a phase angle of the eddy current signal to a predetermined phase angle, and if the phase angle of the eddy current signal is not within a given tolerance of the predetermined phase angle, rotating an angle of the eddy current signal and repeating the scanning and comparing.

19. The system of claim 18, wherein comparing the amplitude of the eddy current signal to a predetermined amplitude and comparing the phase angle of the eddy current signal to a predetermined phase angle comprises comparing the amplitude and the phase angle pre-inspection.

20. The system of claim 18, wherein comparing the amplitude of the eddy current signal to a predetermined amplitude is performed post-inspection.

* * * * *